United States Patent
Zupanc et al.

(10) Patent No.: US 8,616,004 B2
(45) Date of Patent: Dec. 31, 2013

(54) QUENCH JET ARRANGEMENT FOR ANNULAR RICH-QUENCH-LEAN GAS TURBINE COMBUSTORS

(75) Inventors: Frank J. Zupanc, Phoenix, AZ (US); Thomas J. Bronson, Mesa, AZ (US)

(73) Assignee: Honeywell International Inc., Morristown, NJ (US)

( * ) Notice: Subject to any disclaimer, the term of this patent is extended or adjusted under 35 U.S.C. 154(b) by 917 days.

(21) Appl. No.: 12/607,815

(22) Filed: Oct. 28, 2009

(65) Prior Publication Data

US 2010/0162712 A1 Jul. 1, 2010

Related U.S. Application Data

(63) Continuation-in-part of application No. 11/947,337, filed on Nov. 29, 2007, now Pat. No. 8,127,554.

(51) Int. Cl.
*F02C 3/14* (2006.01)

(52) U.S. Cl.
USPC .......................................................... 60/754

(58) Field of Classification Search
USPC .................................................. 60/752–760
See application file for complete search history.

(56) References Cited

U.S. PATENT DOCUMENTS

| | | | |
|---|---|---|---|
| 3,608,310 A * | 9/1971 | Vaught | 60/752 |
| 4,698,963 A | 10/1987 | Taylor | |
| 4,805,397 A * | 2/1989 | Barbier et al. | 60/800 |
| 4,893,475 A | 1/1990 | Willis | |
| 5,819,540 A | 10/1998 | Massarani | |
| 5,996,351 A | 12/1999 | Feitelberg | |
| 6,070,412 A | 6/2000 | Ansart et al. | |
| 6,101,814 A | 8/2000 | Hoke et al. | |
| 6,240,731 B1 | 6/2001 | Hoke et al. | |
| 6,260,359 B1 | 7/2001 | Monty et al. | |
| 6,286,298 B1 | 9/2001 | Burrus et al. | |
| 6,378,286 B2 | 4/2002 | Vermes et al. | |
| 6,474,070 B1 | 11/2002 | Danis et al. | |
| 6,513,331 B1 * | 2/2003 | Brown et al. | 60/754 |
| 6,810,673 B2 | 11/2004 | Snyder | |
| 6,826,913 B2 | 12/2004 | Wright | |
| 7,000,400 B2 | 2/2006 | Schumacher et al. | |
| 7,065,972 B2 | 6/2006 | Zupanc et al. | |

(Continued)

OTHER PUBLICATIONS

USPTO Notice of Allowance and Fee(s) Due for U.S. Appl. No. 11/947,337; Date Mailed Oct. 28, 2011.

(Continued)

*Primary Examiner* — Andrew Nguyen
(74) *Attorney, Agent, or Firm* — Ingrassia Fisher & Lorenz, P.C.

(57) ABSTRACT

A combustor for a turbine engine includes an outer liner having a first group of air admission holes and defining a plurality of outer liner regions. The combustor further includes an inner liner circumscribed by the outer liner and forming a combustion chamber therebetween, the inner liner having a second group of air admission holes and defining a plurality of inner liner regions. The combustor further includes a plurality of fuel injectors extending into the combustion chamber and configured to deliver an air-fuel mixture to the combustion chamber, each of the plurality of fuel injectors being associated with one of the outer liner regions and one of the inner liner regions. The first group within a respective outer liner region includes air admission holes that circumferentially alternate between approximately a first size and approximately a second size, the first size being different than the second size.

16 Claims, 7 Drawing Sheets

(56) References Cited

U.S. PATENT DOCUMENTS

| | | |
|---|---|---|
| 7,185,497 B2 | 3/2007 | Dudebout et al. |
| 2002/0017101 A1* | 2/2002 | Schilling et al. ............... 60/747 |
| 2002/0116929 A1 | 8/2002 | Snyder |
| 2007/0084219 A1* | 4/2007 | Bernier et al. ................. 60/804 |
| 2007/0125093 A1 | 6/2007 | Burd et al. |
| 2007/0193248 A1 | 8/2007 | Bessagnet et al. |
| 2008/0083224 A1 | 4/2008 | Varatharajan et al. |
| 2008/0127651 A1 | 6/2008 | Zupanc et al. |
| 2009/0139239 A1 | 6/2009 | Zupanc et al. |
| 2009/0218821 A1 | 9/2009 | ElKady et al. |

OTHER PUBLICATIONS

EP Search Report, EP 08169732.8-1602/2065644 dated Aug. 14, 2013.

* cited by examiner

QUENCH JET ARRANGEMENT FOR ANNULAR RICH-QUENCH-LEAN GAS TURBINE COMBUSTORS

PRIORITY CLAIM

This application is a continuation-in-part of U.S. application Ser. No. 11/947,337, filed Nov. 29, 2007, the entirety of which is hereby incorporated by reference.

TECHNICAL FIELD

The present invention generally relates to gas turbine engine combustors, and more particularly, to quench jet arrangements for reducing NOx emissions from annular rich burn, quick-quench, lean burn (RQL) gas turbine engine combustors.

BACKGROUND

Gas turbine engines, such as those used to power modern commercial aircraft, typically include a compressor for pressurizing a supply of air, a combustor for burning a fuel in the presence of the pressurized air, and a turbine for extracting energy from the resultant combustion gases. The combustor typically includes radially spaced apart inner and outer liners. The inner and outer liners define an annular combustion chamber between the compressor and the turbine. A number of circumferentially distributed fuel injectors project into the forward end of the combustion chamber to supply the fuel to the combustion chamber. Rows of circumferentially distributed air admission holes penetrate each liner to admit air into the combustion chamber.

There is an increasing emphasis on the reduction of gaseous pollutant emissions that form during the combustion process of gas turbine engines, particularly oxides of nitrogen (NOx). One approach to reduce NOx emissions is the implementation of a rich burn, quick quench, lean burn (RQL) combustion concept. A combustor configured for RQL combustion includes the following three serially arranged combustion zones: a rich burn zone at the forward end of the combustor, a quick quench or dilution zone downstream of the rich burn zone, and a lean burn zone downstream of the quench zone. By precisely controlling the zone stoichiometries between the air and fuel, high-temperature excursions can be reduced and the resulting NOx emissions can be minimized. The effectiveness of the RQL concept, however, is primarily dependent on the design of the quick quench section of the combustor where the fuel-rich gases from the rich burn zone are rapidly mixed with excess air and passed to the lean burn zone. The design and development of the quench zone geometry is one of the challenges in the successful implementation of low-emissions RQL combustors.

Accordingly, it is desirable to provide a combustor with improved NOx emissions. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine includes an outer liner having a first group of air admission holes and defining a plurality of outer liner regions, each outer liner region being separated from an adjacent outer liner region by an outer boundary line. The combustor further includes an inner liner circumscribed by the outer liner and forming a combustion chamber therebetween, the inner liner having a second group of air admission holes and defining a plurality of inner liner regions, each inner liner region being separated from an adjacent inner liner region by an inner boundary line. The combustor further includes a plurality of fuel injectors extending into the combustion chamber and configured to deliver an air-fuel mixture to the combustion chamber, each of the plurality of fuel injectors being associated with one of the outer liner regions and one of the inner liner regions. The first group of air admission holes within a respective outer liner region includes air admission holes that circumferentially alternate between approximately a first size and approximately a second size, the first size being different than the second size.

In accordance with another exemplary embodiment, a combustor for a turbine engine having a fuel injector includes a first liner having a first group of air admission holes and defining a plurality of liner regions, each liner region being separated from an adjacent liner region by a boundary line; and a second liner forming a combustion chamber with the first liner. The first group of air admission holes includes a first air admission hole approximately on the boundary line between the respective liner region and a first adjacent liner region, a second air admission hole downstream of the first air admission hole and approximately axially aligned with the fuel injector, and a third air admission hole approximately on the boundary line between the respective liner region and a second adjacent liner region and circumferentially aligned with the first air admission hole such that the first group of air admission holes generally forms a V-shaped pattern.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Exemplary embodiments described herein provide a rich-quench-lean gas turbine engine with a combustor that reduces NOx emissions. Particularly, the combustor can include inner and outer liners with V-shaped arrangements of air admission holes that produce quench jets arranged to reduce NOx emissions at a first, upstream position between injectors and at a second, downstream position aligned with the injectors. The air admission holes may alternate between relatively large major holes and relatively small minor holes.

Figure 1:
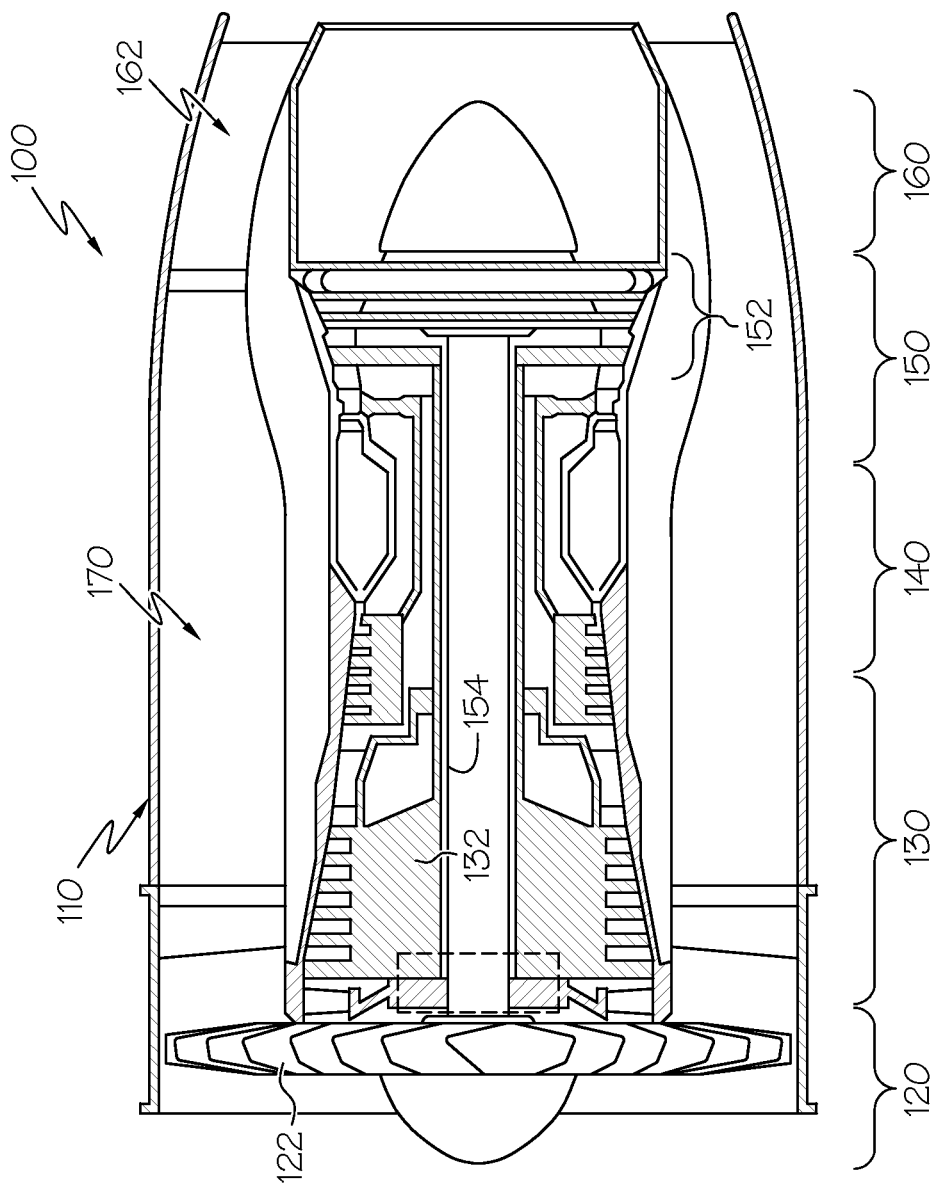
FIG. 1 is a cross-sectional view of a gas turbine engine in accordance with an exemplary embodiment.

FIG. 1 is a simplified, cross-sectional view of a gas turbine engine 100 according to an exemplary embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through the turbines 152 and causes them to rotate. The air is then exhausted through a propulsion nozzle 162 disposed in the exhaust section 160, providing additional forward thrust. In one embodiment, the turbines 152 rotate to thereby drive equipment in the engine 100 via concentrically disposed shafts or spools. Specifically, the turbines 152 may drive the compressor 132 via one or more rotors 154.

Figure 2:
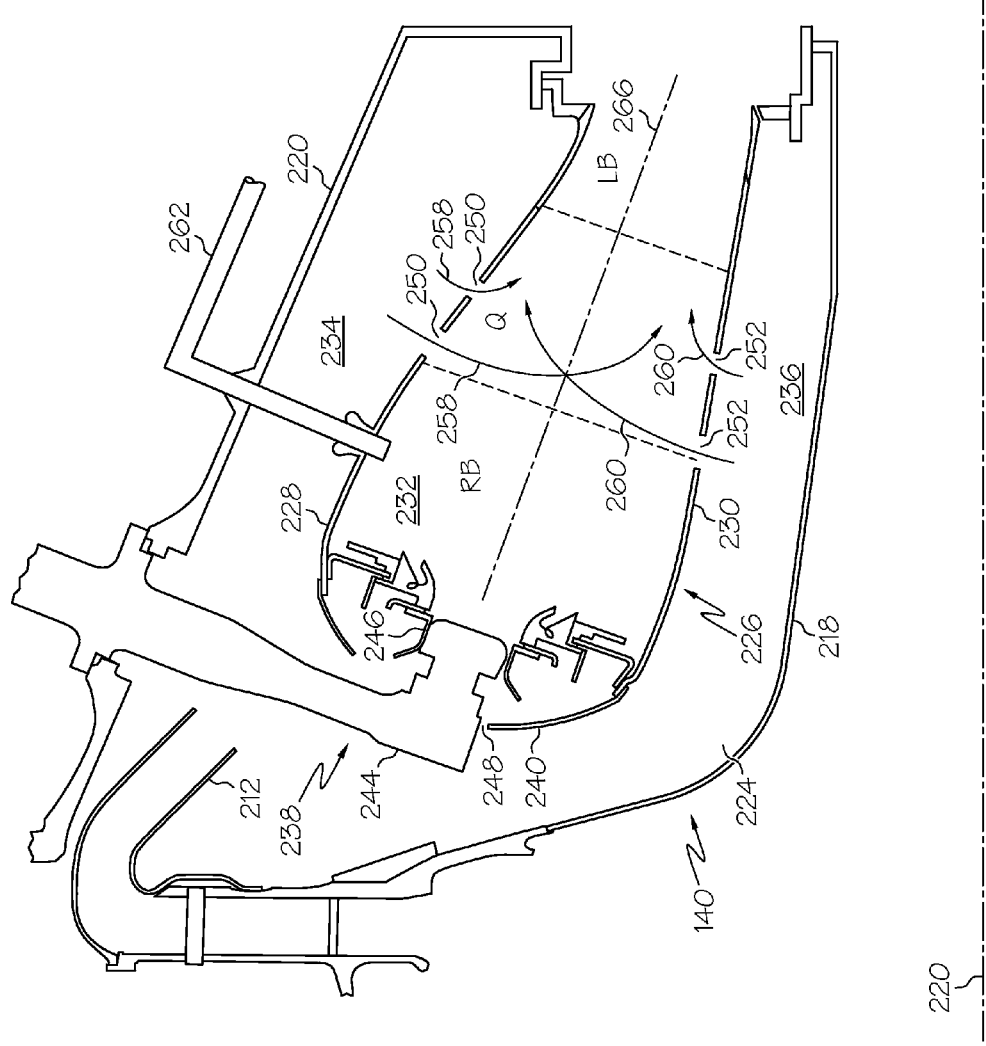
FIG. 2 is a partial, cross-sectional side elevation view of a combustor in a turbine engine such as in FIG. 1 in accordance with an exemplary embodiment.

FIG. 2 is a more detailed cross-sectional view of the combustion section 140 of FIG. 1 in accordance with an exemplary embodiment. In FIG. 2, only half the cross-sectional view is shown; the other half would be substantially rotationally symmetric about a centerline and axis of rotation, which typically corresponds to an axially extending engine centerline 220.

The combustor section 140 has a radially inner case 218 and a radially outer case 220 concentrically arranged with respect to the inner case 218. The inner and outer cases 218, 220 circumscribe the axially extending engine centerline 220 to define an annular pressure vessel 224. The combustor section 140 also includes a combustor 226 residing within the annular pressure vessel 224. The combustor 226 is defined by an outer liner 228 circumscribing an inner liner 230 to define an annular combustion chamber 232. The liners 228, 230 cooperate with cases 218, 220 to define respective outer and inner air plenums 234, 236.

The combustor 226 includes a front end assembly 238 having an annularly extending shroud 240, fuel injectors 244, and fuel injector guides 246. One fuel injector 244 and one fuel injector guide 246 are shown in the partial cross-sectional view of FIG. 2. In one embodiment, the combustor 226 includes a total of sixteen circumferentially distributed fuel injectors 244, but the combustor 226 can be implemented with more or fewer than this number of injectors 244.

The shroud 240 extends between and is secured to the forwardmost ends of the outer and inner liners 228, 230. A plurality of circumferentially distributed shroud ports 248 accommodate the fuel injectors 244 and introduce air into the forward end of the combustion chamber 232. Each fuel injector 244 is secured to the outer case 220 and projects through one of the shroud ports 248, and each fuel injector 244 introduces a swirling, intimately blended fuel-air mixture that supports combustion in the combustion chamber 232.

The depicted combustor 226 is a rich burn, quick quench, lean burn (RQL) combustor. During operation, a portion of the pressurized air flows through a diffuser 212 and enters a rich burn zone RB of the combustion chamber 232 by way of passages in the front end assembly 238. This air is referred to as primary combustion air because it intermixes with a stoichiometrically excessive quantity of fuel introduced through the fuel injectors 244 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. Jets 258, 260 flow from the plenums 234, 236 and into the quench zone Q through the groups of air admission holes 250, 252 in the outer and inner liners 228, 230, respectively. The groups of air admission holes 250, 252 in the outer and inner liners 228, 230 are discussed in further detail below with reference to FIGS. 3-5. As also discussed in greater detail below, the air admission holes 250, 252 may be flush or plunged with the respect to the outer and inner liners 228, 230, and the combustor 226 may be a single or dual-wall liner combustor.

The jets 258, 260 are referred to as quench air because they rapidly mix the combustion products from their stoichiometrically rich state at the forward edge of the quench zone Q to a stoichiometrically lean state at, or just downstream of, the aft edge of the quench zone Q. The quench air rapidly mixes with the combustion products entering the quench zone Q to support further combustion and release additional energy from the fuel. Since thermal NOx formation is a strong time-at-temperature phenonenon, it is important that the fuel-rich mixture passing through the quench zone be mixed rapidly and thoroughly to a fuel-lean state in order to avoid excessive NOx generation. Thus the design of the quench air jet arrangement in an RQL combustor is important to the successful reduction of NOx levels.

Finally, the combustion products from the quench zone Q enter a lean burn zone LB where the combustion process concludes. As the combustion products flow into the lean burn zone LB, the air jets 258, 260 are swept downstream and also continue to penetrate radially and spread out laterally and intermix thoroughly with the combustion gases.

Figure 3:
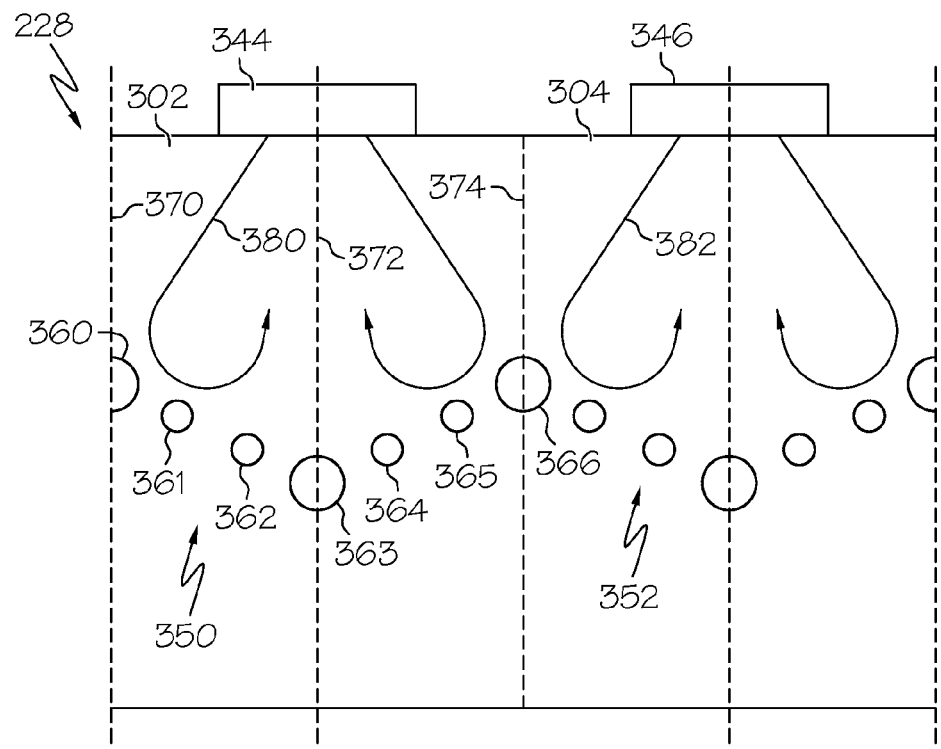
FIG. 3 is a partial, plan view of an exemplary outer liner of the combustor of FIG. 2.

FIG. 3 is a plan view of a portion of the outer liner 228 in accordance with an exemplary embodiment. Generally, the outer liner 228 can be considered a series of regions, e.g., regions 302, 304. Each region 302, 304 is associated with an injector, e.g., injector 344, 346. Each of the regions 302, 304 has a group of air admission holes 350, 352, which generally correspond to the air admission holes 250 that admit jets into the quench zone Q of the combustor as discussed above in reference to FIG. 2. Although the arrangement of air admission holes 350, 352 are discussed with reference to the combustor 226 of FIG. 2, the arrangement may be incorporated into any suitable combustor.

As an example, region 302 includes at least portions of seven air admission holes 360-366 that form a "V" configuration to ensure that the fuel air mixture quickly becomes thoroughly blended and regularly distributed. A first air admission hole 360 is positioned on a first boundary line 370 between the region 350 and an adjacent region (not shown). Second and third air admission holes 361, 362 are adjacent to and downstream of the first air admission hole 360. The fourth air admission hole 363 is axially aligned with the injector 344, as indicated by the dashed line 372, and downstream of the third air admission hole 362. The fifth and sixth air admission holes 364, 365 are adjacent to and upstream of the fourth air admission hole 363. The seventh air admission hole 366 is positioned on a second boundary line 374 between the region 302 and the adjacent region 304 and is upstream of the sixth air admission hole 365. Generally, the first air admission hole 360 is circumferentially aligned with the seventh air admission hole 366, and the second and third air admission holes 361, 362 are respectively circumferentially aligned with the sixth and fifth air admission holes 365, 364. The first, fourth, and seventh air admission holes 360, 363, 366 are relatively larger than the second, third, fifth, and sixth air admission holes 361, 362, 364, 365. As such, the first, fourth, and seventh air admission holes 360, 363, 366 are considered "major" holes and the second, third, fifth, and sixth air admission holes 361, 362, 364, 365 are considered "minor" holes. The group of air admission holes 352 in the adjacent second region 304 are positioned in the same pattern as the group of air admission holes 350 in the first region 302 with the seventh air admission hole 366 of the first region 302 serving as the first air admission hole of the second region 304.

Swirler flowfield patterns 380, 382 are shown for each of the first and second regions 302, 304. Due to the tendency of the swirlers to form an "outside-in" recirculation zone, in some conventional engines, the regions in between adjacent swirlers may exhibit less effective mixing and correspondingly may result in excessive NOx formation upstream of the quench zone. The first and seventh air admission holes 360, 366 are particularly positioned between regions (e.g., regions 302, 304) to reduce residence times of the local combustion gases in the regions between adjacent swirlers and thereby reduce the formation of NOx. Similarly, the "outside-in" recirculation zone tends to draw air upstream into the core of the recirculation in line with each swirler. This results in a local reduction in the fuel-rich stoichiometry of the primary zone and produce additional NOx formation. Accordingly, the fourth air admission hole 363 is positioned further downstream from the central recirculation zone to mitigate the amount of quench air that gets recirculated, thereby further reducing NOx formation in the primary zone. The first and seventh air admission holes 360, 366 are generally upstream of similar air admission holes in some conventional combustors, and the fourth air admission hole 363 is generally downstream of a similar air admission hole in some conventional combustors.

Figure 4:
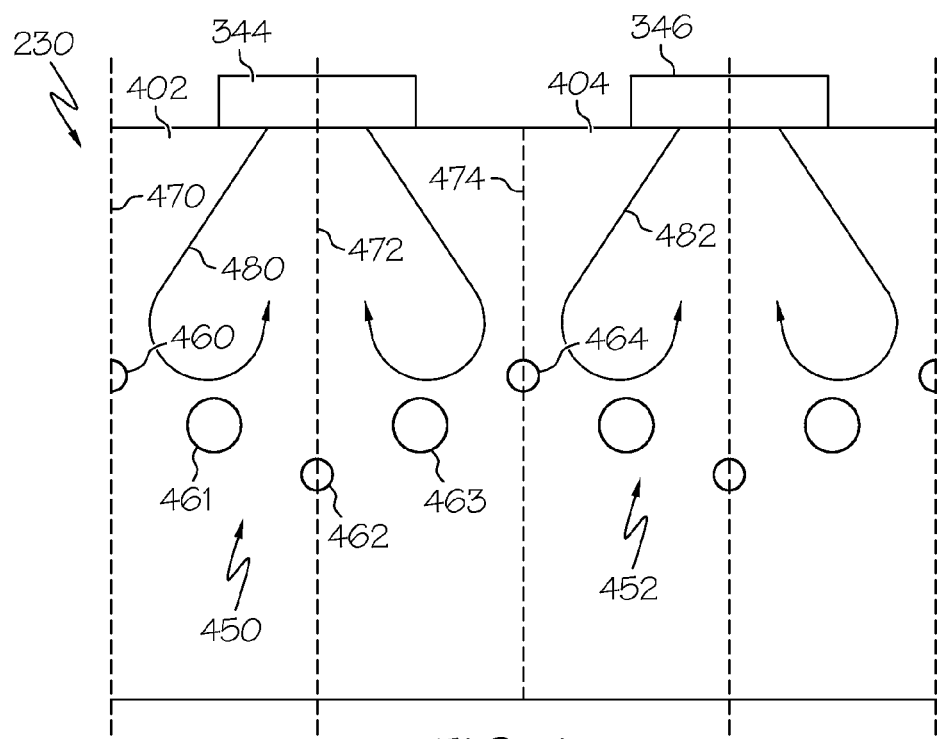
FIG. 4 is a partial, plan view of an exemplary inner liner of the combustor of FIG. 2.

FIG. 4 is a plan view of a portion of the inner liner 330 in accordance with an exemplary embodiment. As noted above, the portion of the inner liner 230 works in conjunction with an outer liner such as outer liner 228 (FIG. 3) to ensure that air is properly mixed with the fuel. Generally, the inner liner 230 can be considered a series of regions, e.g., regions 402, 404. Each region 402, 404 is associated with an injector, e.g., injector 344, 346. Each of the regions 402, 404 has a group of air admission holes 450, 452, which generally correspond to the air admission holes 252 that admit jets into the quench zone Q of the combustor as discussed above in reference to FIG. 2. Although the arrangement of air admission holes 450, 452 are discussed with reference to the combustor 226 of FIG. 2, the arrangement may be incorporated into any suitable combustor.

As an example, region 402 includes at least portions of five air admission holes 460-464 that form a "V" configuration on the inner liner. A first air admission hole 460 is positioned on a first boundary line 470 between the region 402 and an adjacent region (not shown). A second air admission hole 461 is adjacent to and downstream of the first air admission hole 460. The third air admission hole 462 is axially aligned with the injector 344, as indicated by the dashed line 472, and downstream of the second air admission hole 461. The fourth air admission hole 463 is adjacent to and upstream of the third air admission hole 462. The fifth air admission hole 464 is positioned on a second boundary line 474 between the region 402 and the adjacent region 404 and is upstream of the fourth air admission hole 463. Generally, the first air admission hole 460 is circumferentially aligned with the fifth air admission hole 464, and the second air admission hole 461 is circumferentially aligned with the fourth air admission hole 463. The first, third, and fifth air admission holes 460, 462, 464 are relatively smaller than the second and fourth air admission holes 461, 463. As such, the first, third, and fifth air admission holes 460, 462, 464 are considered "minor" holes and the second and fourth air admission holes 461, 463 are considered "major" holes. The group of air admission holes 452 in the adjacent second region 404 are positioned in the same pattern as the group of air admission holes 450 in the first region 402 with the fifth air admission hole 464 of the first region 402 serving as the first air admission hole of the second region 404. As noted above, flowfield patterns 480, 482 occur with respect to the inner liner 230, and the air admission holes 450, particularly air admission holes 460, 462, 464, are positioned to reduce NOx formation.

Figure 5:
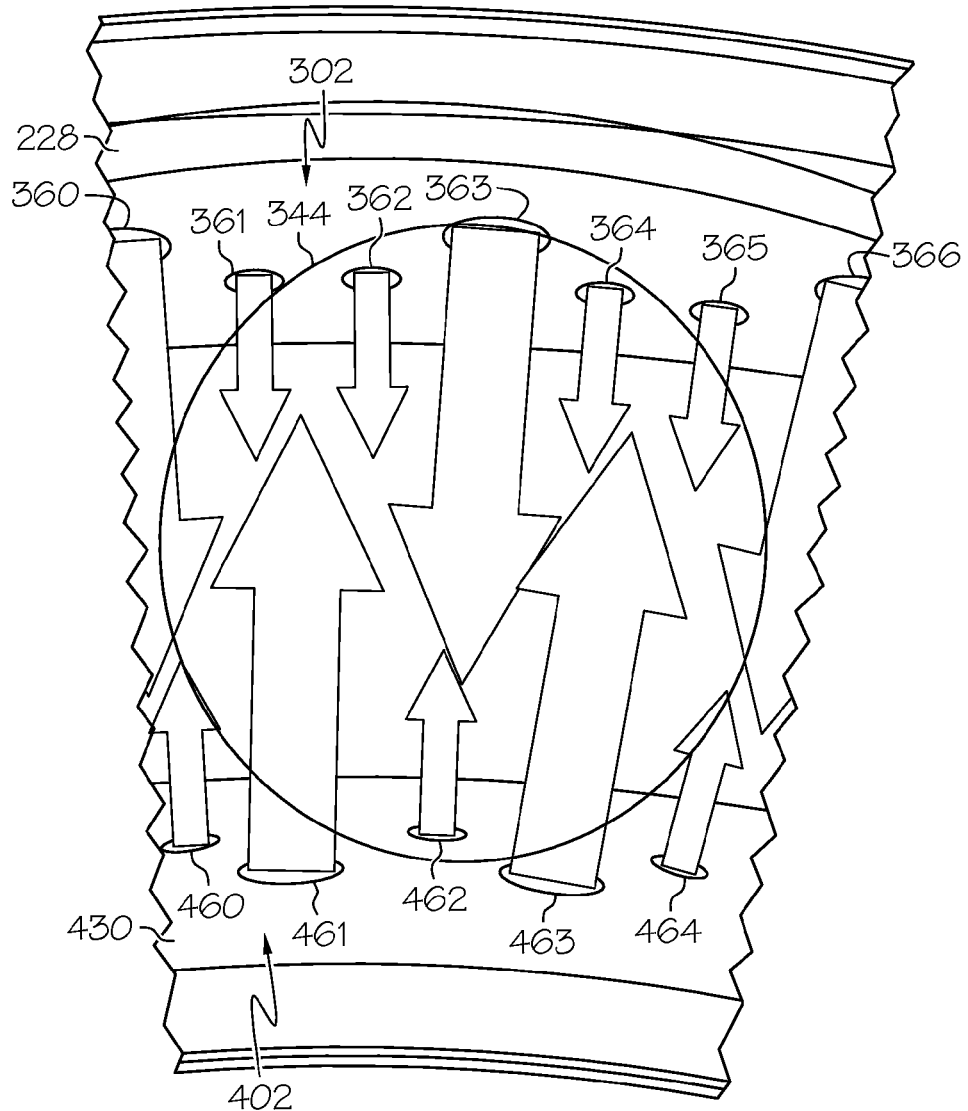
FIG. 5 is a partial, axial cross-sectional view of the combustor of FIG. 2.

FIG. 5 illustrates a partial axial cross-sectional view of the first regions 302, 402 of the outer and inner liners 228, 230. As discussed above, the air admission holes 360-366 of the outer liner 228 cooperate with air admission holes 460-464 of the inner liner 430. Generally, major jets from the major holes, such as air admission hole 360 and air admission hole 461, penetrate radially inward about 75% of the width of the combustion chamber, and minor jets from the minor holes, such as air admission hole 460 and air admission holes 361, 362, penetrate radially inward about 25% of the width of the combustion chamber. In this embodiment, the major jets from the major holes, such as air admission hole 360, are paired with minor jets from the minor holes, such as air admission hole 461. In other words, the major holes in the outer and inner liners 228, 230 can be considered staggered with respect to one another, and the minor holes in the outer and inner liners 228, 230 can similarly be considered staggered. This configuration ensures that dilution air spans radially across the entire combustion chamber annulus and that the combustion gases are properly quenched, thus preventing elevated levels of NOx.

Figure 6:
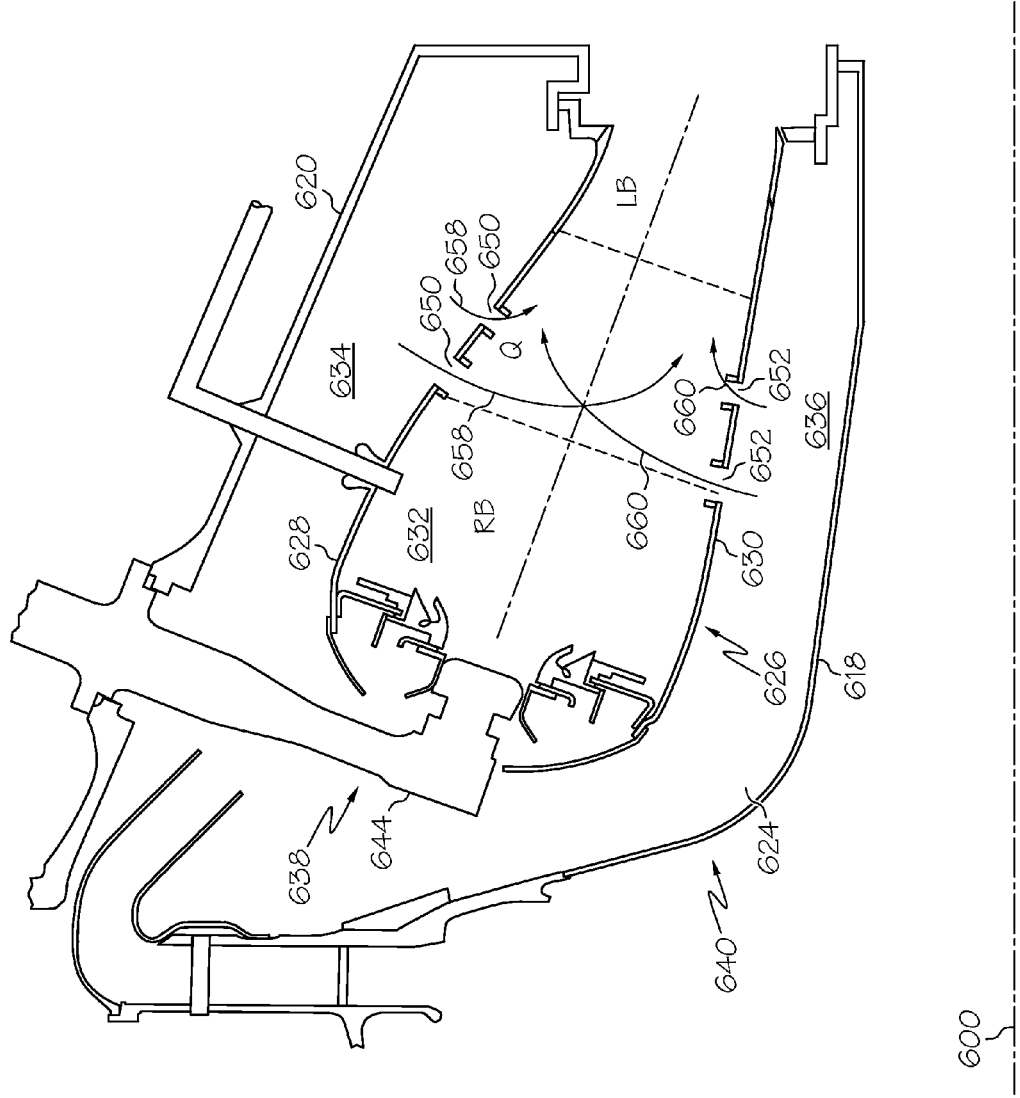
FIG. 6 is a partial, cross-sectional side elevation view of a combustor section in accordance with another exemplary embodiment.

FIG. 6 is a partial, axial cross-sectional view of a combustor section 640 in accordance with an alternative exemplary embodiment. The combustion section 640 includes a radially inner case 618 and a radially outer case 620 concentrically arranged with respect to the inner case 618. The inner and outer cases 618, 620 circumscribe the axially extending engine centerline 600 to define an annular pressure vessel 624. The combustion section 640 also includes a combustor 626 residing within the annular pressure vessel 624. The combustor 626 is defined by an outer liner 628 and an inner liner 630 that is circumscribed by the outer liner 628 to define an annular combustion chamber 632. The liners 628, 630 cooperate with cases 618, 620 to define respective outer and inner air plenums 634, 636. The combustor 626 includes a front end assembly 638 that generally corresponds to the front assembly 238 (FIG. 2) discussed above. A fuel injector 644 introduces a swirling, intimately blended fuel-air mixture that supports combustion in the combustion chamber 632.

The depicted combustor 626 is a rich burn, quick quench, lean burn (RQL) combustor. During operation, the combustion products flow through the rich burn zone RB, which include unburned fuel, then enter a quench zone Q. Jets 658, 660 flow from the plenums 634, 636 and into the quench zone Q through the groups of air admission holes 650, 652 in the outer and inner liners 628, 630, respectively. The quench air rapidly mixes with the combustion products entering the quench zone Q to support further combustion and release additional energy from the fuel. The combustion products from the quench zone Q enter a lean burn zone LB where the combustion process concludes. As the combustion products flow into the lean burn zone LB, the air jets 658, 660 are swept downstream and also continue to penetrate radially and spread out laterally and intermix thoroughly with the combustion gases. The groups of air admission holes 650, 652 in the outer and inner liners 628, 630 are discussed in further detail below with reference to FIGS. 7 and 8. Also, in this particular exemplary embodiment, the air admission holes 650, 652 are "plunged" in that the air admission holes extend at least partially into the combustion chamber 632, which is discussed in greater detail below with reference to FIGS. 9-11. In other embodiments, the holes 650, 652 are not plunged and are flush with the liners 628, 630. As discussed in greater detail blow, the combustor 626 may be a single or dual-wall liner combustor.

Figure 7:
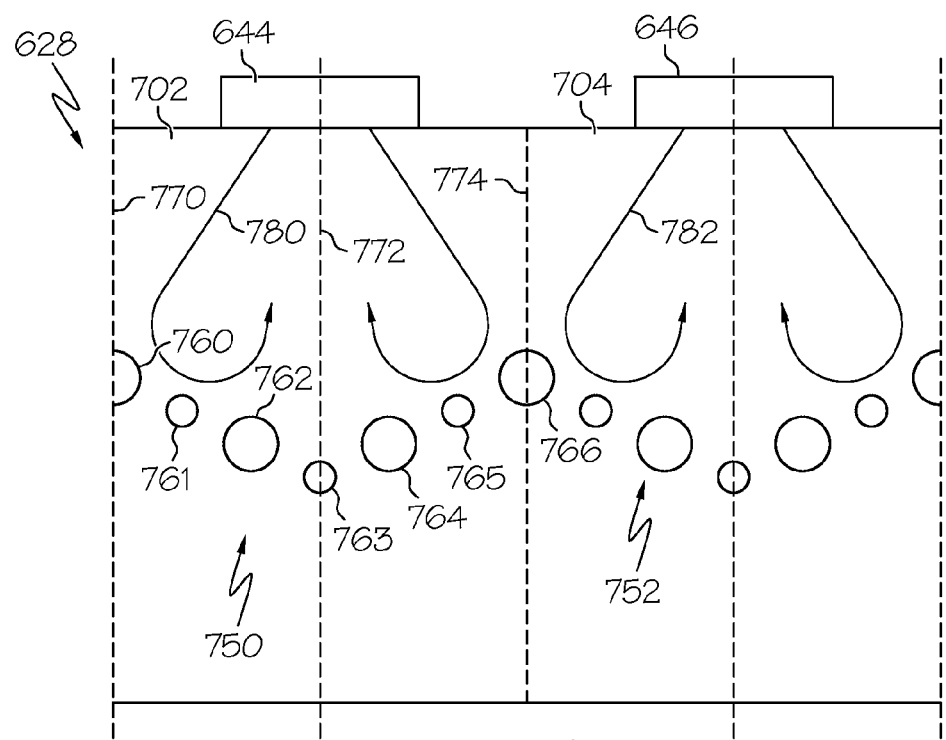
FIG. 7 is a partial, plan view of an exemplary outer liner of the combustor section of FIG. 6.

FIG. 7 is a plan view of a portion of the outer liner 628 in accordance with an exemplary embodiment. Although described with respect to the combustor 626 of FIG. 6, the arrangement of air admission holes in FIG. 7 may also be incorporated into the combustor 226 of FIG. 2 or any other suitable combustor. Generally, the outer liner 628 can be considered a series of regions, e.g., regions 702, 704. Each region 702, 704 is associated with an injector, e.g., injector 644, 646. Each of the regions 702, 704 has a group of air admission holes 750, 752, which generally correspond to the air admission holes 650 that admit jets into the quench zone Q of the combustor as discussed above in reference to FIG. 6.

As an example, region 702 includes at least portions of seven air admission holes 760-766 that form a "V" configuration to ensure that the fuel air mixture quickly becomes thoroughly blended and regularly distributed. A first air admission hole 760 is positioned on a first boundary line 770 between the region 702 and an adjacent region (not shown). Second and third air admission holes 761, 762 are adjacent to and downstream of the first air admission hole 760. The fourth air admission hole 763 is axially aligned with the injector 644, as indicated by the dashed line 772, and downstream of the third air admission hole 762. The fifth and sixth air admission holes 764, 765 are adjacent to and upstream of the fourth air admission hole 763. The seventh air admission hole 766 is positioned on a second boundary line 774 between the region 702 and the adjacent region 704 and is upstream of the sixth air admission hole 765. Generally, the first air admission hole 760 is circumferentially aligned with the seventh air admission hole 766, and the second and third air admission holes 761, 762 are respectively circumferentially aligned with the sixth and fifth air admission holes 765, 764. The first, third, fifth, and seventh air admission holes 760, 762, 764, 766 are relatively larger than the second, fourth, and sixth air admission holes 761, 763, 765. As such, the first, third, fifth, and seventh air admission holes 760, 762, 764, 766 are considered "major" holes and the second, fourth, and sixth air admission holes 761, 763, 765 are considered "minor" holes. The group of air admission holes 752 in the adjacent second region 704 are positioned in the same pattern as the group of air admission holes 750 in the first region 702 with the seventh air admission hole 766 of the first region 702 serving as the first air admission hole of the second region 704. Although only one minor hole 761, 763, 765 is shown between each major hole 760, 762, 764, 766, additional minor holes may be added between the major holes 760, 762, 764, 766. In one alternate exemplary embodiment, two minor holes are positioned between each set of major holes 760, 762, 764, 766. Moreover, in further exemplary embodiments, no minor holes are provided between the major holes 760, 762, 764, 766.

Swirler flowfield patterns 780, 782 are shown for each of the first and second regions 702, 704. Due to the tendency of the swirlers to form an "outside-in" recirculation zone, in some conventional engines, the regions in between adjacent swirlers may exhibit less effective mixing and correspondingly may result in excessive NOx formation upstream of the quench zone. The first and seventh air admission holes 760, 766 are particularly positioned between regions (e.g., regions 702, 704) to reduce residence times of the local combustion gases in the regions between adjacent swirlers and thereby reduce the formation of NOx. Similarly, the "outside-in" recirculation zone tends to draw air upstream into the core of the recirculation in line with each swirler. This results in a local reduction in the fuel-rich stoichiometry of the primary zone and produce additional NOx formation. Accordingly, the fourth air admission hole 763 is positioned further downstream from the central recirculation zone to mitigate the amount of quench air that gets recirculated, thereby further reducing NOx formation in the primary zone. The first and seventh air admission holes 760, 766 are generally upstream of similar air admission holes in some conventional combustors, and the fourth air admission hole 763 is generally downstream of a similar air admission hole in some conventional combustors.

Figure 8:
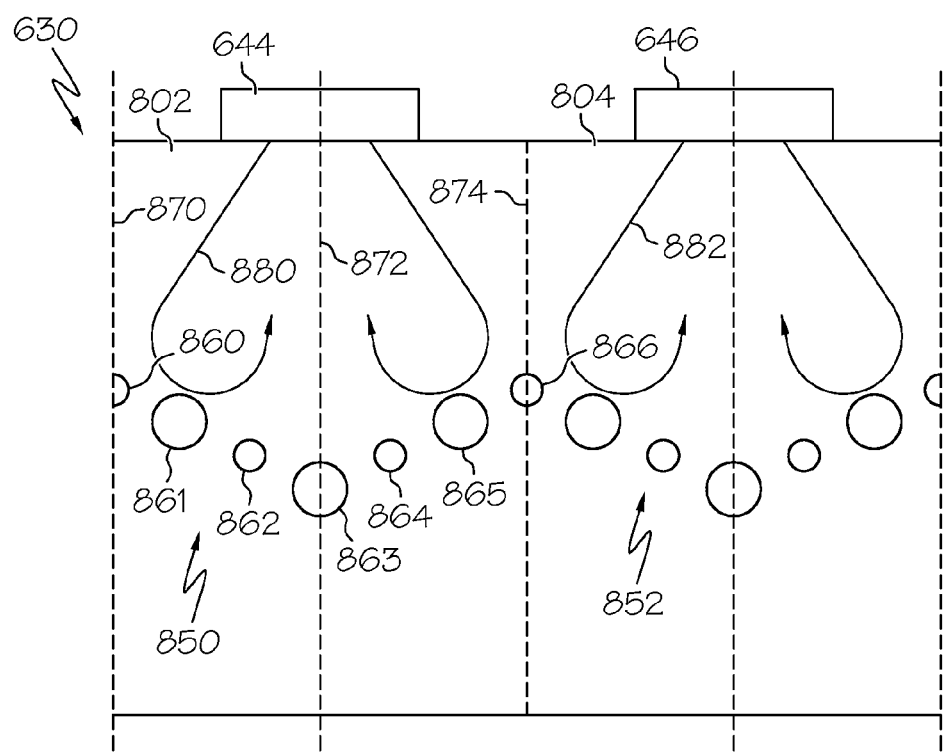
FIG. 8 is a partial, plan view of an exemplary inner liner of the combustor section of FIG. 6.

FIG. 8 is a plan view of a portion of the inner liner 630 in accordance with an exemplary embodiment. Although described with respect to the combustor 626 of FIG. 6, the arrangement of air admission holes in FIG. 8 may also be incorporated into the combustor 226 of FIG. 2 or any other suitable combustor. As noted above, the portion of the inner liner 630 works in conjunction with an outer liner such as outer liner 628 (FIG. 7) to ensure that air is properly mixed with the fuel. Generally, the inner liner 630 can be considered a series of regions, e.g., regions 802, 804. Each region 802, 804 is associated with an injector, e.g., injector 644, 646. Each of the regions 802, 804 has a group of air admission holes 850, 852, which generally correspond to the air admission holes 652 that admit jets into the quench zone Q of the combustor as discussed above in reference to FIG. 6.

As an example, region 802 includes at least portions of seven air admission holes 860-866 that form a "V" configuration on the inner liner 630. A first air admission hole 860 is positioned on a first boundary line 870 between the region 802 and an adjacent region (not shown). A second air admission hole 861 is adjacent to and downstream of the first air admission hole 860. A third air admission hole 862 is adjacent to and downstream of the second air admission hole 861. A fourth air admission hole 863 is axially aligned with the injector 644, as indicated by the dashed line 872, and downstream of the third air admission hole 862. A fifth air admission hole 864 is adjacent to and upstream of the fourth air admission hole 863. A sixth air admission hole 865 is adjacent to and upstream of the fifth air admission hole 864. A seventh air admission hole 866 is positioned on a second boundary line 874 between the region 802 and the adjacent region 804 and is upstream of the sixth air admission hole 865. Generally, the first air admission hole 860 is circumferentially aligned with the seventh air admission hole 866, and the second air admission hole 461 is circumferentially aligned with the sixth air admission hole 865. Similarly, the third air admission hole 862 is circumferentially aligned with the fifth air admission hole 864. As noted above, flowfield patterns 880, 882 occur with respect to the inner liner 630, and the air admission holes 850, particularly air admission holes 860, 863, 866, are positioned to reduce NOx formation.

The first, third, fifth, and seventh air admission holes 860, 862, 864, 866 are relatively smaller than the second, fourth, and sixth air admission holes 861, 863, 865. As such, the first, third, fifth, and seventh air admission holes 860, 862, 864, 866 are considered "minor" holes and the second, fourth, and sixth air admission holes 861, 863, 865 are considered "major" holes. The group of air admission holes 852 in the adjacent second region 804 are positioned in the same pattern as the group of air admission holes 850 in the first region 802 with the seventh air admission hole 866 of the first region 802 serving as the first air admission hole of the second region 804. Although only one minor hole 860, 862, 864, 866 is shown between each major hole 861, 863, 865, additional minor holes may be added between the major holes 861, 863, 865. In one alternate exemplary embodiment, two minor holes are positioned between each set of major holes 861, 863, 865. Moreover, in further exemplary embodiments, no minor holes are provided between the major holes 861, 863, 865.

Referring now to both FIGS. 7 and 8, as discussed above, the air admission holes 760-766 of the outer liner 628 cooperate with air admission holes 860-866 of the inner liner 630. In one exemplary embodiment, the air admission holes 760-766 are radially aligned with the air admission holes 860-866. Generally, major jets from the major holes, such as air admission hole 760 and air admission hole 861, penetrate radially inward about 75% of the width of the combustion chamber, and minor jets from the minor holes, such as air admission hole 761 and air admission holes 860, penetrate radially inward about 25% of the width of the combustion chamber. In this embodiment, the major jets from the major holes, such as air admission hole 760, are paired with minor jets from the minor holes, such as air admission hole 860, such that one major jet is radially aligned with one minor jet. This configuration ensures that dilution air spans radially across the entire combustion chamber annulus and that the combustion gases are properly quenched, thus preventing elevated levels of NOx.

The arrangements in FIGS. 7 and 8 provide an increased number of major air admission holes (e.g., air admission holes 760, 762, 764, 766, 861, 863, 865) as compared to previous embodiments. This may result in increased jet density with tighter jet patterns, which may lead to less primary zone escapes and leakages.

Figure 9:
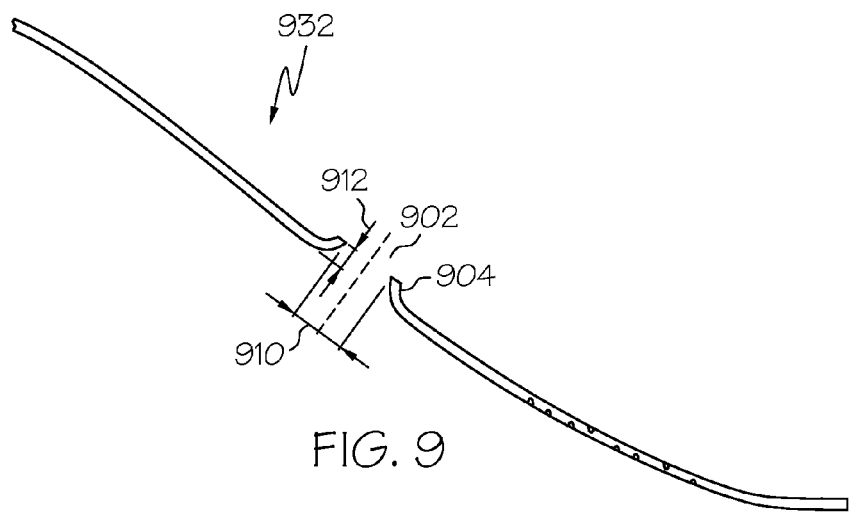
FIG. 9 is a cross-sectional view of an air admission hole of the combustor section of FIG. 6 in accordance with an exemplary embodiment.

FIG. 9 is a cross-sectional view of an exemplary air admission hole 902 suitable use in a combustor, e.g., the combustor 626 of FIG. 6. The air admission hole 902 may represent any of the air admission holes 650, 652 of the outer or inner liner 628, 630, including air admission holes 761-766, 861-866 discussed above in reference to FIGS. 7 and 8. In particular, the air admission holes, such as air admission hole 902, are "plunged." In other words, a rim portion 904 of the air admission hole 902 extends into the combustion chamber. The plunged characteristics of the air admission holes 902 assist in the jets (e.g., jets 658, 660) in penetrating to the desired depth, as discussed above. Moreover, in one exemplary embodiment, the outer and inner liners (e.g., outer and inner liners 228, 230, 628, 630) have effusion holes that provide a cooling layer of air on the combustor side of the combustion chamber 932. Since this cooling layer is generally moving along the respective liner perpendicular to the major and minor jets, in conventional combustors, the cooling layer may interfere with the jets. However, in some exemplary embodiments, the plunged air admission holes 902 decrease or eliminate any interference with the effusion cooling layer.

In the embodiment shown in FIG. 9, the air admission holes 902 are formed from a single piece, either punched or molded into the liner. In general, the air admission holes 602 may be circular or non-circular. The penetration depth of the jets (e.g., jets 658, 660) and the corresponding quantity of air admitted through the air admission holes may additionally be regulated by specifying the relative sizes (e.g., diameter 910 and length 912) of the air admission holes, i.e., a larger air admission hole 902 and/or a more plunged air admission hole 902 has a larger penetrative depth. As a result of this configuration, the temperature profile of the combustion gases can be adjusted, for example, by adjusting the size of the air admission holes 902, without compromising fuel-air mixing, which could lead to elevated levels of NOx.

An exemplary diameter of the air admission holes 902 associated with major holes (e.g., hole 760 in FIG. 7) is about 0.4 inches, and exemplary diameter of air admission holes 902 associated with minor holes (e.g., hole 761 in FIG. 7) is about 0.25 inches, although the diameters can vary and can be scaled for larger or smaller engines.

In one embodiment, the plunge radius of curvature and depth of the air admission hole may depend on material thickness and hole diameter. For example, with a 0.02 inch diameter hole, the plunge radius of curvature may be 0.080 to 0.100 inches to create a desirable flow inlet. The plunge radius of curvature in thicker material it may be larger, such as about 0.150 inches. In one embodiment, the depth of the air admission hole may be between 0.075 to 0.150 inches. In general, the depth may be sufficient to extend through the cooling film and provide some reduction of the discharge coefficient.

Figure 10:
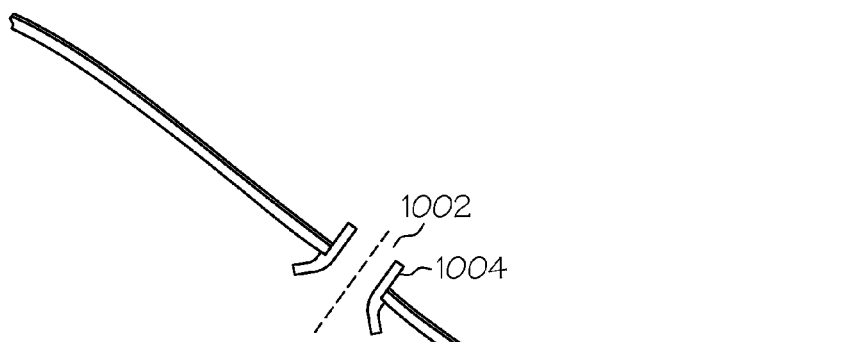
FIG. 10 is a cross-sectional view of an air admission hole of the combustor section of FIG. 6 in accordance with an alternate exemplary embodiment.

FIG. 10 is a cross-sectional view of an air admission hole 1002 in accordance with an alternate exemplary embodiment that generally corresponds to the air admission holes discussed above. In this embodiment, the air admission hole 1002 is plunged with an insert 1004, which can be manufactured separately and installed in the outer or inner liner (e.g., outer or inner liner 628, 630 of FIG. 6).

Figure 11:
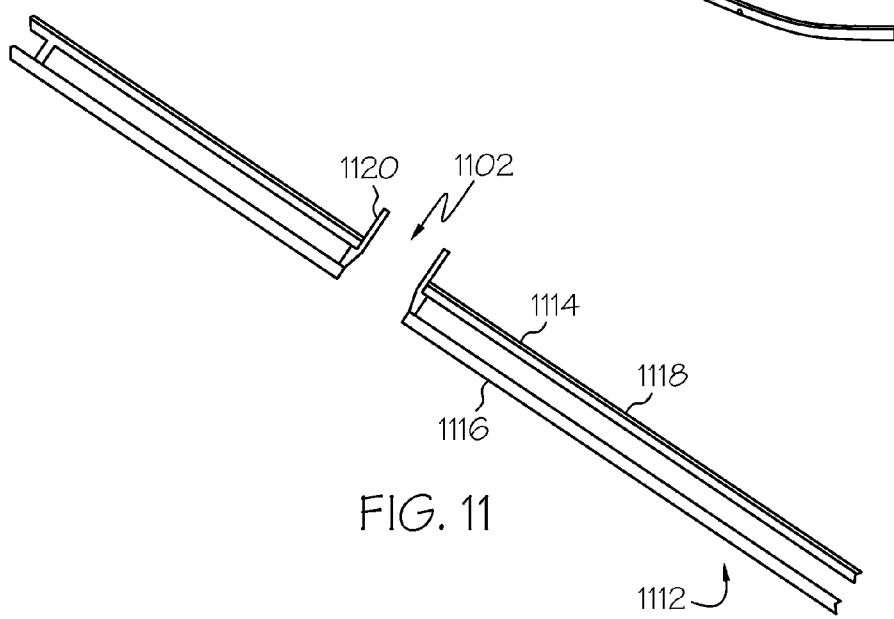
FIG. 11 is a cross-sectional view of an air admission hole of a combustor section in accordance with another alternate exemplary embodiment.

FIG. 11 is a cross-sectional view of a portion of a combustor liner 1112 in accordance with an additional exemplary embodiment. In this embodiment, the combustor liner 1112 can be the inner or outer liner in combustors similar to those described above. Moreover, the combustor liner 1112 is a dual wall liner with a first, inner wall 1114 and a second, outer wall 1116 that may increase the cooling effects of the combustor walls. Typically, in a dual wall configuration, the inner wall 1114 includes a plurality of cooling tiles or heat shields 1118. This improved cooling may lead to additional air available for the combustion process and a corresponding decrease in unwanted emissions.

The combustor liner 1112 further includes an air admission hole 1102 in accordance with an alternate exemplary embodiment that generally corresponds to the air admission holes discussed above. In this embodiment, the air admission hole 1102 is plunged with an insert 1120, which can be manufactured separately and installed in the combustor liner 1112. In any of the embodiments discussed above, particularly the embodiments in FIGS. 9-11, the inlets and/or outlets of the air admission holes 902, 1002, 1102 may be modified as necessary or desired. For example, the inlets of the air admission holes 902, 1002, 1102 may be a non-circular shape, including rectangular, racetrack, oval, and square. Additionally, the air admission holes 902, 1002, 1102 may be clocked if additional alignment or interleaving of the jets is desire in dependence, for example, on upstream swirl and effusion film.

The air admission holes 902, 1002, 1102 may be incorporated into the combustor 226 of FIG. 2 or the combustor 626 of FIG. 6. For example, the combustor 208 of FIG. 2 and the combustor 608 of FIG. 6 may be dual wall combustors and include groups of air admission holes 1102 in arrangements such as those illustrated by FIGS. 3, 4, 7, and/or 8. The incorporation of plunged holes 902, 1002, 1102 to the combustors 226, 626 of FIGS. 2 and 6 arranged in the patterns illustrated by FIGS. 3, 4, 7, and/or 8 may result in more precise control and alignment over the quench jet trajectories and relative alignment between the inner and outer liner quench jet patterns. Moreover, it is believed that reduced circumferential spreading and diffusion of the resulting jets also advantageously reduce interaction with the effusion cooling air. In general, increased jet density results in more effective coverage.

Exemplary embodiments described herein provide a rich-quench-lean gas turbine engine with a combustor that produces reduced NOx emissions. Particularly, in one exemplary embodiment, the combustor can include inner and outer liners that have a V-shaped arrangement of staggered plunged air admission holes, with quench jets arranged to produce reduced NOx emissions at a first, upstream position between injectors and at a second, downstream position aligned with the injectors.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   an outer liner having a first group of air admission holes and defining a plurality of outer liner regions, each outer liner region being separated from an adjacent outer liner region by an outer boundary line;
   an inner liner circumscribed by the outer liner and forming a combustion chamber therebetween, the inner liner having a second group of air admission holes and defining a plurality of inner liner regions, each inner liner region being separated from an adjacent inner liner region by an inner boundary line; and
   a plurality of fuel injectors extending into the combustion chamber and configured to deliver an air-fuel mixture to the combustion chamber, each of the plurality of fuel injectors being associated with one of the outer liner regions and one of the inner liner regions, wherein the first group of air admission holes within a respective outer liner region includes air admission holes that circumferentially alternate between approximately a first size and approximately a second size, the first size being different than the second size, wherein each outer boundary line is defined approximately equidistant between respective adjacent fuel injectors,
   wherein the first group of air admission holes includes a first air admission hole approximately on the outer boundary line between the respective outer liner region and a first adjacent outer liner region, a second air admission hole downstream of the first air admission hole and approximately axially aligned with one of the plurality of fuel injectors, and a third air admission hole approximately on the outer boundary line between the respective outer liner region and a second adjacent outer liner region, the third air admission hole being upstream of the second air admission hole, and
   wherein each of the air admission holes is configured to admit a quench jet into the combustion chamber,
   wherein the second group of air admission holes within a respective inner liner region includes air admission holes that circumferentially alternate between approximately the first size and approximately the second size, and wherein the air admission holes of the first group are arranged with respect to the air admission holes of the second group such that the air admission holes of the first size are radially aligned with the air admission holes of the second size.

2. The combustor of claim 1, wherein the first air admission hole and the third air admission hole are approximately the first size and the second air admission hole is approximately the second size.

3. The combustor of claim 2, wherein the first group of air admission holes further includes
   a fourth air admission hole downstream of the first air admission hole, upstream of the second air admission hole, and between the first and second air admission holes, and
   a fifth air admission hole downstream of the fourth air admission hole, upstream of the second air admission hole, and between the fourth and second air admission hole.

4. The combustor of claim 3, wherein the fourth air admission hole is approximately the second size and the fifth air admission hole is approximately the first size.

5. The combustor of claim 4, wherein the first group of air admission holes further includes
   a sixth air admission hole upstream of the second air admission hole, approximately circumferentially aligned with the fifth air admission hole, and between the second and third air admission holes, and
   a seventh air admission hole upstream of the sixth air admission hole, approximately circumferentially aligned with the fourth air admission hole, and between the sixth and third air admission holes,
   the sixth air admission hole being approximately the first size and the seventh air admission hole being approximately the second size.

6. The combustor of claim 5, wherein the second group of air admission holes within a respective inner liner region includes
   an eighth air admission hole radially aligned with the first air admission hole of the first group, the eighth air admission hole being the second size,
   a ninth air admission hole radially aligned with the fourth air admission hole of the first group, the ninth air admission hole being the first size, a tenth air admission hole radially aligned with the fifth air admission hole of the first group, the tenth air admission hole being the second size, an eleventh air admission hole radially aligned with the second air admission hole of the first group, the eleventh air admission hole being the first size, an twelfth air admission hole radially aligned with the sixth air admission hole of the first group, the twelfth air admission hole being the second size, a thirteenth air admission hole radially aligned with the seventh air admission hole of the first group, the thirteenth air admission hole being the first size, and a fourteenth air admission hole radially aligned with the third air admission hole of the first group, the fourteenth air admission hole being the second size.

7. The combustor of claim 6, wherein the first size is larger than the second size.

8. The combustor of claim 1, wherein the first group of air admission holes has a pattern that is repeated in additional groups of air admission holes in the adjacent outer regions.

9. The combustor of claim 1, wherein the first group of air admission holes includes at least portions of at least seven air admission holes.

10. The combustor of claim 1, wherein the first group of air admission holes are plunged.

11. The combustor of claim 10, wherein the plunged air admission holes of the first group are integral with the outer liner.

12. The combustor of claim 10, wherein the plunged air admission holes of the first group each includes an insert that extends into the combustion chamber.

13. The combustor of claim 10, wherein the outer liner is a dual walled liner with a first wall and a second wall.

14. The combustor of claim 13, wherein the plunged air admission holes of the first group each includes an insert that directs air through the first wall, through the second wall, and into the combustion chamber.

15. The combustor of claim 1
wherein the first group of air admission holes generally forms a V-shaped pattern.

16. A combustor for a turbine engine, comprising:
an outer liner having a first group of air admission holes and defining a plurality of outer liner regions, each outer liner region being separated from an adjacent outer liner region by an outer boundary line;

an inner liner circumscribed by the outer liner and forming a combustion chamber therebetween, the inner liner having a second group of air admission holes and defining a plurality of inner liner regions, each inner liner region being separated from an adjacent inner liner region by an inner boundary line; and a plurality of fuel injectors extending into the combustion chamber and configured to deliver an air-fuel mixture to the combustion chamber, each of the plurality of fuel injectors being associated with one of the outer liner regions and one of the inner liner regions, wherein the first group of air admission holes within a respective outer liner region includes air admission holes that circumferentially alternate between approximately a first size and approximately a second size, the first size being different than the second size, wherein the first group of air admission holes includes
a first air admission hole approximately on the outer boundary line between the respective outer liner region and a first adjacent outer liner region, a second air admission hole downstream of the first air admission hole and approximately axially aligned with one of the plurality of fuel injectors, and a third air admission hole approximately on the outer boundary line between the respective outer liner region and a second adjacent outer liner region, a fourth air admission hole downstream of the first air admission hole, upstream of the second air admission hole, and circumferentially between the first and second air admission holes, a fifth air admission hole downstream of the fourth air admission hole, upstream of the second air admission hole, and circumferentially between the fourth and second air admission hole, a sixth air admission hole upstream of the second air admission hole and approximately circumferentially aligned with the fifth air admission hole and circumferentially between the second and third air admission holes, a seventh air admission hole upstream of the sixth air admission hole, downstream of the third air admission hole, and circumferentially between the sixth and third air admission holes, wherein the first, third, fifth, and sixth air admission holes are the first size, and the second, fourth, and seventh air admission holes are the second size, and wherein the second group of air admission holes within a respective inner liner region includes an eighth air admission hole radially aligned with the first air admission hole of the first group, the eighth air admission hole being the second size, a ninth air admission hole radially aligned with the fourth air admission hole of the first group, the ninth air admission hole being the first size, a tenth air admission hole radially aligned with the fifth air admission hole of the first group, the tenth air admission hole being the second size, an eleventh air admission hole radially aligned with the second air admission hole of the first group, the eleventh air admission hole being the first size, an twelfth air admission hole radially aligned with the sixth air admission hole of the first group, the twelfth air admission hole being the second size, a thirteenth air admission hole radially aligned with the seventh air admission hole of the first group, the thirteenth air admission hole being the first size, and a fourteenth air admission hole radially aligned with the third air admission hole of the first group, the fourteenth air admission hole being the second size, wherein each of the air admission holes is configured to admit a quench jet into the combustion chamber.

\* \* \* \* \*